Figure 1:
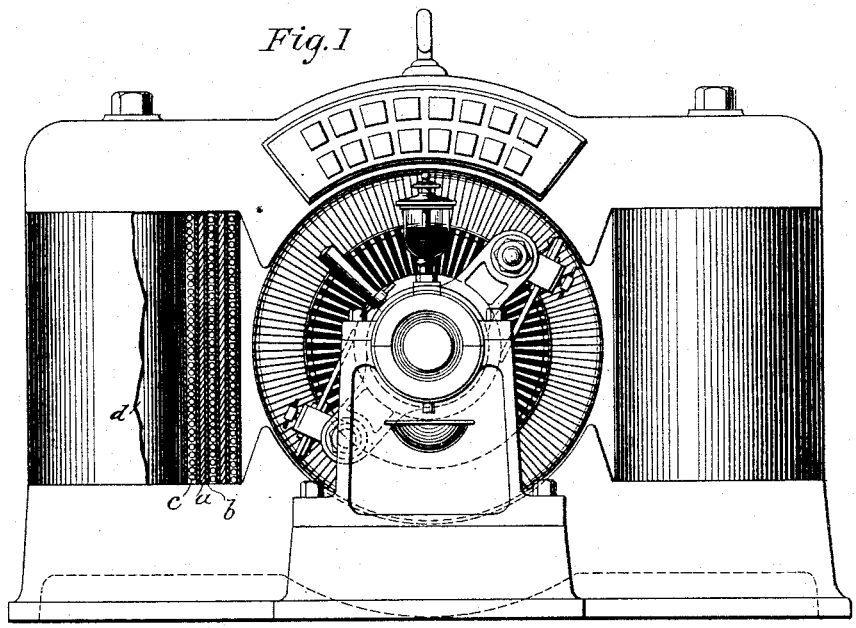

(No Model.) 2 Sheets—Sheet 1.

C. F. WINKLER.
DYNAMO ELECTRIC MACHINE.

No. 412,351. Patented Oct. 8, 1889.

WITNESSES.

INVENTOR.
Charles F. Winkler:
ATTORNEY.

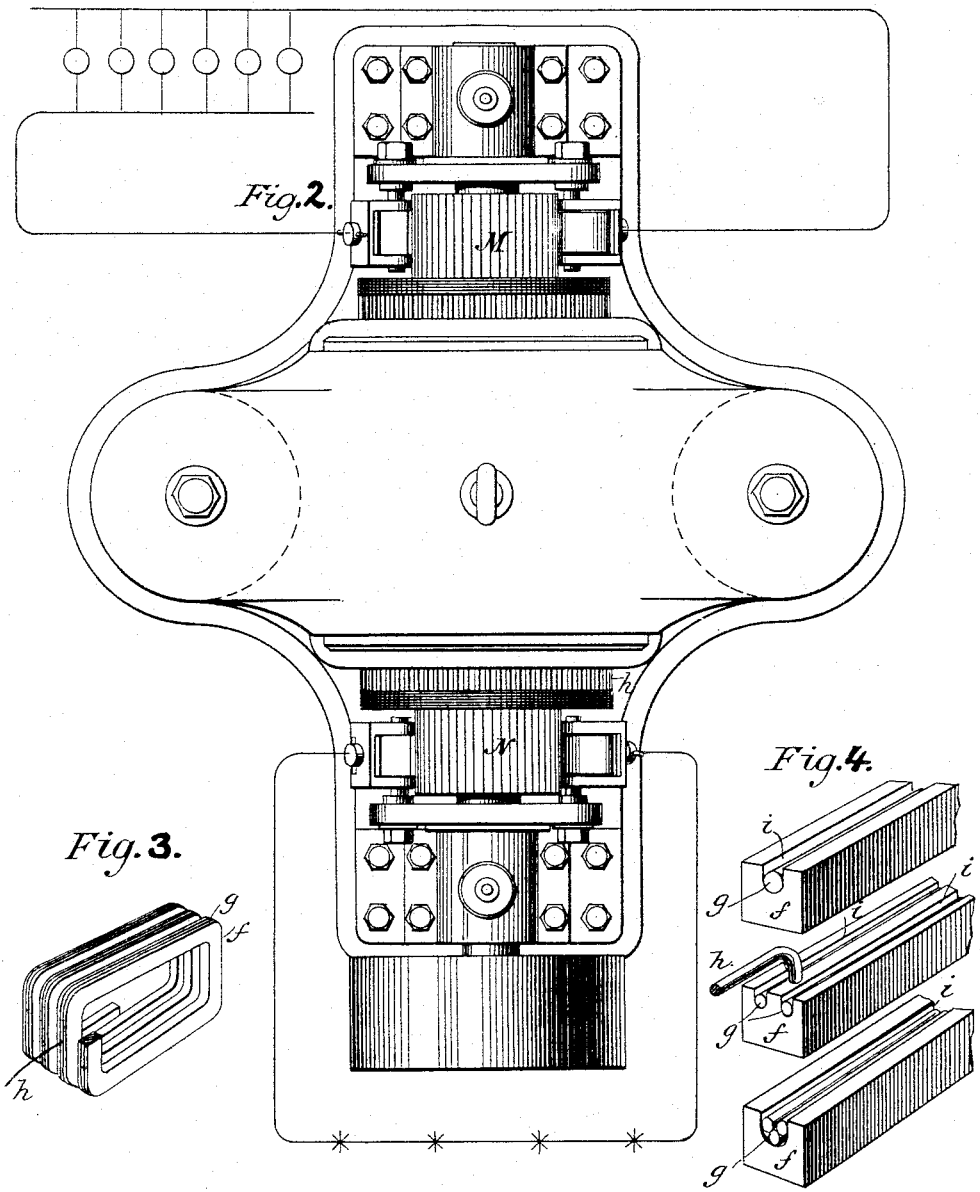

UNITED STATES PATENT OFFICE.

CHARLES F. WINKLER, OF HOOSICK FALLS, NEW YORK.

DYNAMO-ELECTRIC MACHINE.

SPECIFICATION forming part of Letters Patent No. 412,351, dated October 8, 1889.

Application filed February 28, 1889. Serial No. 301,510. (No model.)

*To all whom it may concern:*

Be it known that I, CHARLES F. WINKLER, a citizen of the United States, residing at Hoosick Falls, in the county of Rensselaer and State of New York, have invented certain new and useful Improvements in Dynamo-Electric Machinery, of which the following is a specification.

My invention has reference to dynamo-electric machines and motors, the object being to improve the construction of the armature, to the end that the efficiency will be increased. The machine is designed to generate two separate currents, which are collected by two separate commutators, and of course may be utilized for separate purposes. One of these currents may be low tension, while the other is high tension; or a machine may be constructed wherein the two currents may be of substantially the same tension.

The construction of the machine will now be described with reference to the accompanying drawings, in which—

Figure 1 represents an end elevation of the machine; Fig. 2, a plan of the machine; Fig. 3, details of the armature-winding, and Fig. 4 sectional perspectives showing different methods of disposing of the wire on the armature.

The armature is wound with two separate conductors $f$ and $g$. As shown in this machine, one of the conductors—say $f$—is iron and of a comparatively large cross-section, while the other is copper and of small cross-section. The armature has no core, mechanically as such. Its stability depends upon the rigidity of the iron conductor, which will ordinarily be of about three-fourths of an inch in diameter and rectangular in cross-section. It is bent in the form of coils, as shown in Fig. 3, and the connections with the commutator consist of copper wire $h$, of comparatively small cross-section. These wires enter holes drilled in the outer faces of the iron coils, and run thence to the segments of a commutator M. The copper conductors are ordinary copper wires, and they are wound in grooves $i$, formed in the outer faces of the iron conductor. The grooves may be one or more in number, and each groove may contain one or more wires in accordance with the quantity of winding. The ends of the sections of the copper wire are lead to a separate commutator N. It is of course understood that all conductors are insulated.

When an armature of the above construction revolves in a magnetic field, it is obvious that currents will be induced in both conductors, and that the current induced in the iron conductor will have a low tension, while a high-tension current will be induced in the copper conductor. The magnetic conductor of the armature is the iron constituting the low-tension-current conductor.

In this machine it is impossible for so-called "Eddy currents" to exist, and no heating can take place for the reason that all the metal in the armature forms part of a circuit, and all Eddy currents generated are carried off in the circuit. They in reality augment the efficiency of the machine rather than detract from it.

Having currents of both high and low tension, I am enabled to run incandescent and arc lamps from the same machine simultaneously; or, if I desire, I may energize the field-magnets with one current and utilize the other for work. Again, the winding of the armature may be such that the current in one conductor may oppose that in the other, and may be used for regulating purposes; and, further, a machine may be built on this principle to be operated as a motor, the current from one conductor supplying the motive current, while the current from the other conductor may be used for lighting or any other purpose desired.

Having described my invention, I claim—

1. An armature wound with two separate conductors, one embedded within the other, substantially in the manner set forth.

2. An armature wound with two separate conductors, one embedded within the other, one being of comparatively large cross-section and having grooves formed in it, the other being embedded in said grooves.

3. An armature having wound upon it the conductors of two separate circuits, one of said conductors having a rectangular cross-section and having its outer face grooved to receive the conductors of the other circuit.

Signed at Troy, New York, this 26th day of February, 1889, in the presence of the two witnesses whose names are hereto written.

CHARLES F. WINKLER.

Witnesses:
W. E. HOGAN,
WILLIAM L. HALL.